United States Patent
Sylvester et al.

(10) Patent No.: US 9,719,300 B2
(45) Date of Patent: *Aug. 1, 2017

(54) LADDER RUNG BRACKET ASSEMBLY

(71) Applicant: Panduit Corp., Tinley Park, IL (US)

(72) Inventors: David J. Sylvester, Steger, IL (US); Richard H. Kasal, Bourbonnais, IL (US); Rodney G. Rouleau, Manhattan, IL (US); James R. Ward, Naperville, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/090,113

(22) Filed: Apr. 4, 2016

(65) Prior Publication Data

US 2016/0215562 A1   Jul. 28, 2016

Related U.S. Application Data

(63) Continuation of application No. 14/186,047, filed on Feb. 21, 2014, now Pat. No. 9,309,719.

(Continued)

(51) Int. Cl.
*A47B 96/06* (2006.01)
*E06C 7/14* (2006.01)
(Continued)

(52) U.S. Cl.
CPC ............. *E06C 7/14* (2013.01); *H02G 3/0456* (2013.01); *H02G 3/26* (2013.01); *H02G 3/30* (2013.01); *H02G 3/32* (2013.01)

(58) Field of Classification Search
CPC .... E06C 7/14; H02G 3/26; H02G 3/32; F16L 3/221
See application file for complete search history.

(56) References Cited

U.S. PATENT DOCUMENTS 3,915,420 A   10/1975   Norris
4,140,417 A   2/1979   Danielsen et al.
(Continued)

FOREIGN PATENT DOCUMENTS

DE   10353706 A1   6/2005
DE   102008020894 A1   12/2009
(Continued)

OTHER PUBLICATIONS

Amerifiber, Inc. Ladder Rack Cable Ring, webpage, http://www.amerifiber.com/search.cgi?keywords=LADDER+RACK+CABLE+RING, 1 page, printed Feb. 7, 2014.
(Continued)

*Primary Examiner* — Amy Sterling
(74) *Attorney, Agent, or Firm* — Christopher S. Clancy; James H. Williams; Aimee E. McVady

(57) ABSTRACT

A bracket assembly is disclosed to secure a cable bundle to a ladder rung. The bracket assembly includes a metal bracket and protective grommets. The metal bracket has a first member, side walls and second members. The first member of the metal bracket is parallel to the second members of the metal bracket. The protective grommets are secured to the metal bracket. The protective grommets have a base member, sleeves extending from the base member, a side member and a bottom member. The assembled metal bracket and protective grommets receive the ladder rung and the sleeves of the protective grommets wrap around the cable bundle positioned on the ladder rung to secure the cable bundle.

6 Claims, 16 Drawing Sheets

Related U.S. Application Data

(60) Provisional application No. 61/769,983, filed on Feb. 27, 2013.

(51) Int. Cl.
*H02G 3/04* (2006.01)
*H02G 3/32* (2006.01)
*H02G 3/00* (2006.01)
*H02G 3/30* (2006.01)

(56) References Cited

U.S. PATENT DOCUMENTS

| | | |
|---|---|---|
| 4,156,436 A | 5/1979 | Hawk |
| 4,232,845 A | 11/1980 | Turner |
| 4,319,724 A | 3/1982 | Bradbury |
| 4,369,945 A | 1/1983 | Mantoan et al. |
| 4,432,519 A | 2/1984 | Wright |
| 4,502,743 A | 3/1985 | Ziegler |
| 4,802,643 A | 2/1989 | Uys |
| 5,123,618 A | 6/1992 | Guterman et al. |
| 5,181,774 A | 1/1993 | Lane |
| 5,465,929 A | 11/1995 | Dooley |
| 5,580,014 A | 12/1996 | Rinderer |
| 5,730,400 A | 3/1998 | Rinderer et al. |
| 5,961,081 A | 10/1999 | Rinderer |
| 6,019,322 A | 2/2000 | Shimizu |
| 6,131,869 A | 10/2000 | Durham et al. |
| 6,343,771 B1 | 2/2002 | Simon |
| 6,431,501 B1 | 8/2002 | Molek |
| 6,460,812 B1 | 10/2002 | Jette |
| 6,471,171 B1 | 10/2002 | VanderVelde |
| 6,483,026 B1 | 11/2002 | Snider, Jr. et al. |
| 6,729,585 B2 | 5/2004 | Ogden |
| 6,926,236 B2 | 8/2005 | Jette |
| 7,789,359 B2 | 9/2010 | Chopp, Jr. et al. |
| 7,841,566 B2 | 11/2010 | Kellerman |
| 8,985,532 B2 | 3/2015 | Chirpich et al. |
| 9,309,719 B2 * | 4/2016 | Sylvester ................. E06C 7/14 |
| 2007/0066101 A1 | 3/2007 | Suzuki |
| 2014/0367530 A1 | 12/2014 | Radzik |

FOREIGN PATENT DOCUMENTS

| | | |
|---|---|---|
| EP | 0579929 A1 | 1/1994 |
| EP | 1201980 A2 | 5/2002 |
| FR | 2719167 A1 | 10/1995 |
| WO | 8804486 | 6/1988 |

OTHER PUBLICATIONS

Chatsworth Products, Inc., Threaded Ceiling Kit product cut sheet, http://www.chatsworth.com/workarea/downloadasset.aspx?id=15032387036, 1 page, printed Feb. 7, 2014.

Cooper B-Line, Power Cable Supports, http://www.cooperindustries.com/content/dam/public/bline/Resources/Library/catalogs/commdata_equipment/commdata_supports/Runways.pdf, 2 pages, printed Feb. 7, 2014.

Pentair Technical Products, Ladder Rack System catalog pages, 8 pages, 2011.

\* cited by examiner

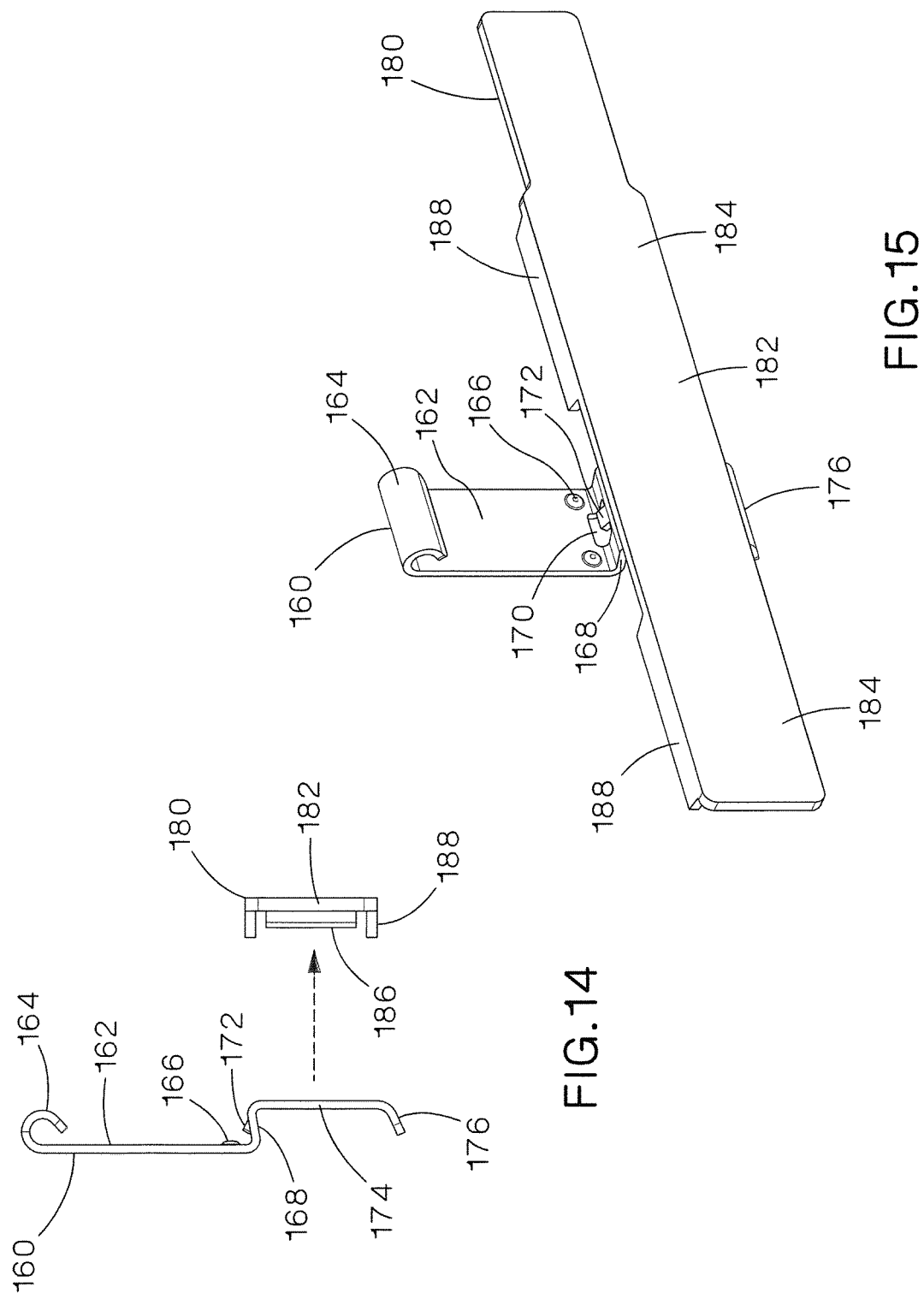

LADDER RUNG BRACKET ASSEMBLY

CROSS-REFERENCE TO RELATED APPLICATIONS

This application is a continuation of U.S. patent application Ser. No. 14/186,047, filed on Feb. 21, 2014, which will issue as U.S. Pat. No. 9,309,719 on Apr. 12, 2016, which claims the benefit of U.S. Provisional Patent Application No. 61/769,983, filed on Feb. 27, 2013, each of which is incorporated by reference in its entirety.

FIELD OF THE INVENTION

The present invention relates to ladder rungs, and more particularly, to a bracket assembly for securing cable bundles to a ladder rung.

BACKGROUND OF THE INVENTION

It is known to secure a bundle of cables to a support member, such as a rung of a ladder rack, with a cable tie or a strap and buckle. Typically a cushion sleeve is used with the cable tie or strap to protect the bundle of cables from being damaged by the cable tie or strap. However, it is difficult to install cable ties or straps with a cushion sleeve because of the variations in rung design, as well as the proximity of other obstructions near the cable bundle and the ladder rack.

It is also well known to use cable cleats to install cable bundles to cable ladder racks. For example, existing cable cleats, such as Ellis Patents' Vulcan and Emperor Cable Cleats, provide an alternative to cable ties or straps and cushion sleeves. However, cable cleats are expensive and difficult to install because cable cleats typically require additional mounting hardware that has been configured for a specific cable routing system.

Thus, it is desirable to provide an improved bracket assembly for attaching cable bundles to a ladder rung.

SUMMARY OF THE INVENTION

The present invention is directed to a bracket assembly that secures cables to a ladder rung. The bracket assembly includes a metal bracket and at least one protective grommet. The metal bracket has a first member, side walls and second members. The first member of the metal bracket is parallel to the second members of the metal bracket. The protective grommets are secured to the metal bracket. Each protective grommet has a base member and sleeves extending from the base member. The protective grommet may also have a side member and a bottom member. The assembled metal bracket and protective grommets receive the ladder rung. The sleeves of the protective grommets wrap around a cable bundle positioned on the ladder rung. The sleeves overlap to secure the cable bundle to the ladder rung.

BRIEF DESCRIPTION OF THE DRAWINGS

FIG. 14 is a side view of the metal bracket and grommet positioned to be assembled to form the ladder rung bracket of FIG. 11.

FIG. 15 is a front perspective view of the assembled metal bracket and grommet of FIG. 14.

DETAILED DESCRIPTION

Figure 1:
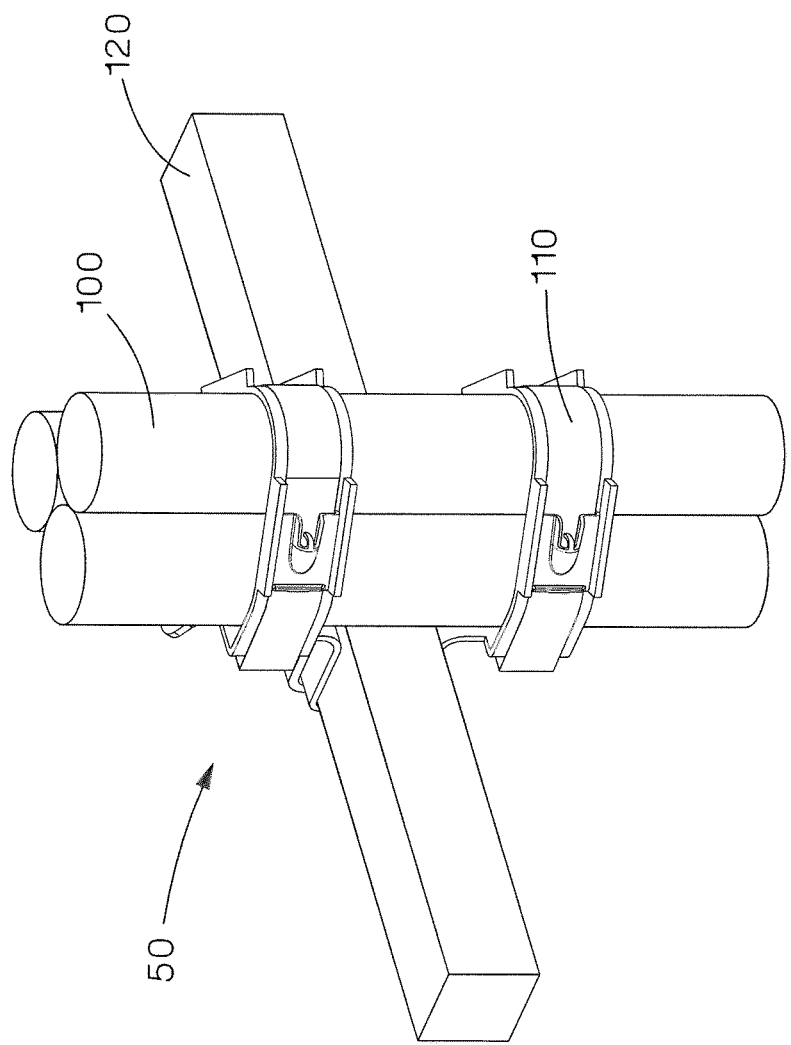
FIG. 1 is a perspective view of a ladder rung bracket assembly securing cable bundles to a ladder rung.

FIGS. 1-10 illustrate a ladder rung bracket assembly 50 designed to be used with a slotted or un-slotted ladder rungs. As illustrated in FIG. 1, the ladder rung bracket assembly 50 of the present invention secures a cable bundle 100 to a ladder rung 120 using metal ties 110. The ladder rung bracket may also secure the cable bundle 100 to a ladder rung 120 using a strap and buckle.

Figure 2:
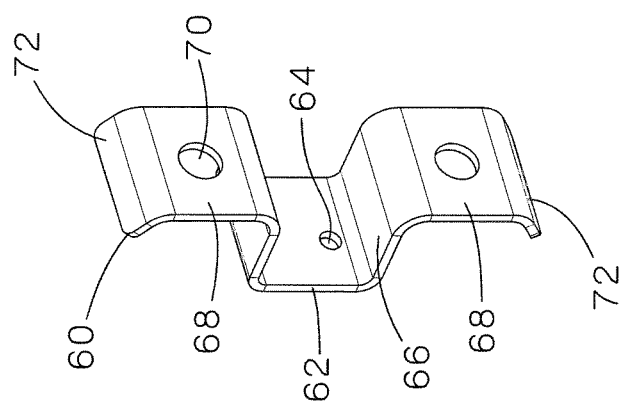
FIG. 2 is a perspective view of a metal bracket of the ladder rung bracket assembly of FIG. 1.

As illustrated in FIGS. 2-6, the ladder rung bracket assembly 50 includes a metal bracket 60 and two protective grommets 80. FIG. 2 illustrates the metal bracket 60. The metal bracket 60 includes a first member 62, side walls 66, and second members 68. The side walls 66 extend from the first member 62 to the second members 68. The first member 62 is parallel to the second members 68. The first and second members 62, 68 include holes 64, 70, respectively, for receiving the locking features 94, 96 of the protective grommets 80 (see FIG. 4). The distal end of each second member 68 includes an outwardly extending flange 72.

Figure 3:
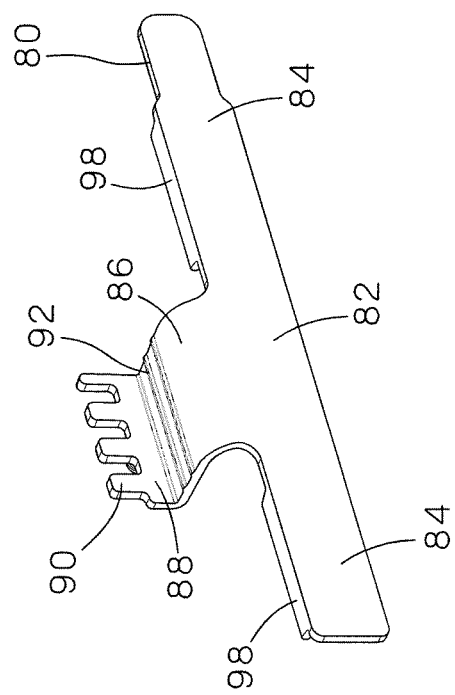
FIG. 3 is a perspective view of one of the protective grommets of the ladder rung bracket assembly of FIG. 1.
Figure 5:
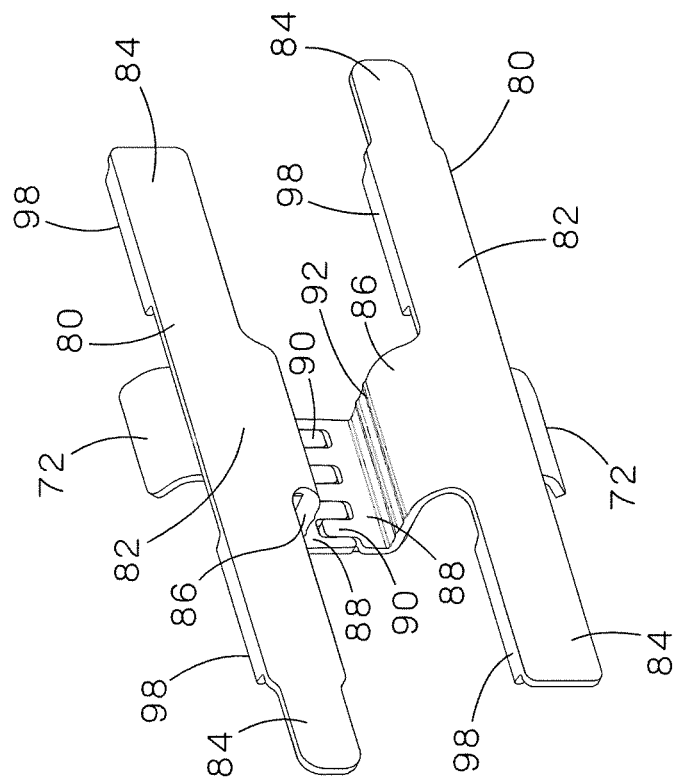
FIG. 5 is a front perspective view of the assembled metal bracket and protective grommet of FIG. 4.

FIG. 3 illustrates one of the protective grommets 80. The protective grommets 80 are identical pieces that interlock with each other as illustrated in FIG. 5. Each protective grommet 80 includes a base member 82 with sleeves 84, a side member 86, and a bottom member 88 with fingers 90. The plurality of fingers 90 of each protective grommet 80 interlock to secure the protective grommets 80 to each other. The interlocked fingers 90 of the bottom members 88 create a channel for receiving the ladder rung 120. The side member 86 and the bottom member 88 include a crown feature 92 to help accommodate different rung dimensions and to increase resistance to movement when the ladder rung bracket assembly 50 is installed on a ladder rung 120.

Figure 4:
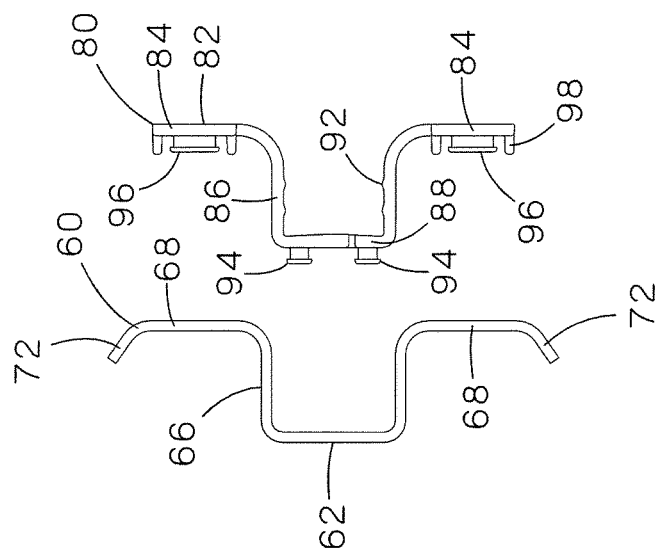
FIG. 4 is a side view of the metal bracket and protective grommet positioned to be assembled to form the ladder rung bracket of FIG. 1.
Figure 6:
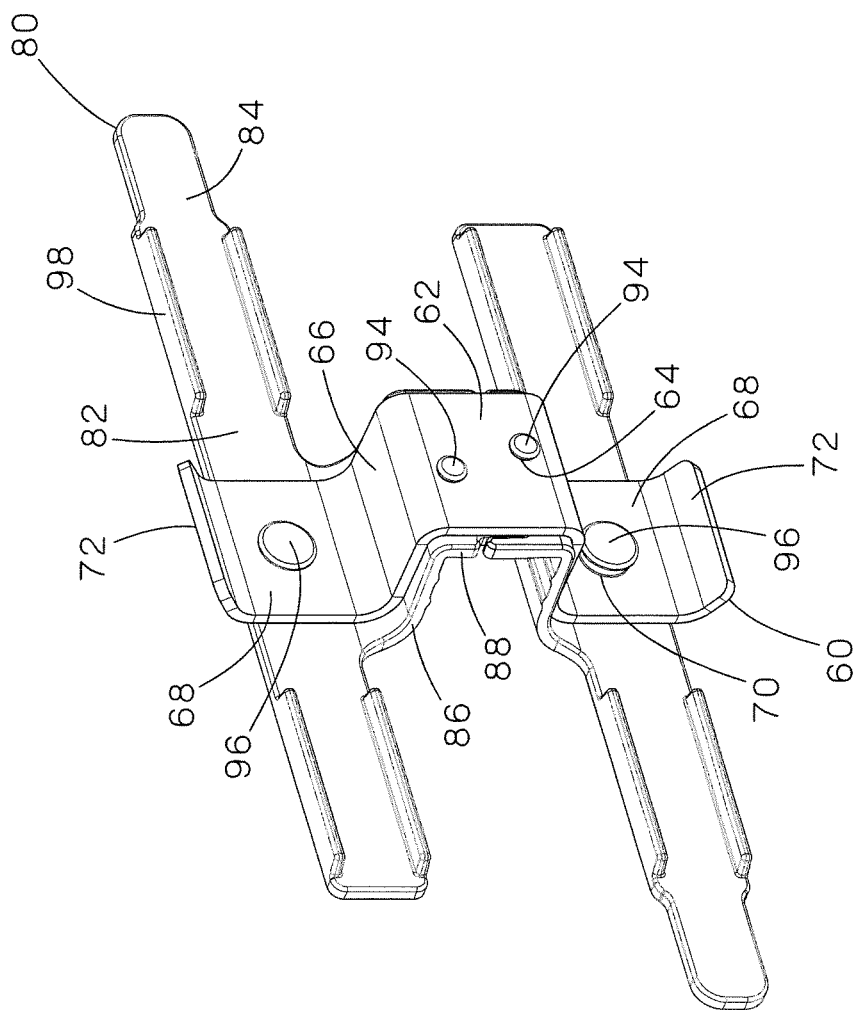
FIG. 6 is a rear perspective view of the assembled metal bracket and protective grommet of FIG. 5.

As illustrated in FIGS. 4 and 6, the backside of the bottom member 88 includes locking features 94 and the backside of the base member 82 includes locking features 96. The locking features 94, 96, such as a pin, rivet or snap, enable the protective grommet 80 to be locked into position when the protective grommet 80 is pressed onto the metal bracket 60. The protective grommet 80 also includes flanges 98 extending from the backside of the sleeves 84. The flanges 98 are interlocking features that receive the metal ties 110 during installation (see FIG. 1). The flanges 98 eliminate the need for the installer to hold the sleeve 84 in position while applying the metal tie 110 during the final installation of the ladder rung bracket assembly 50.

Figure 7:
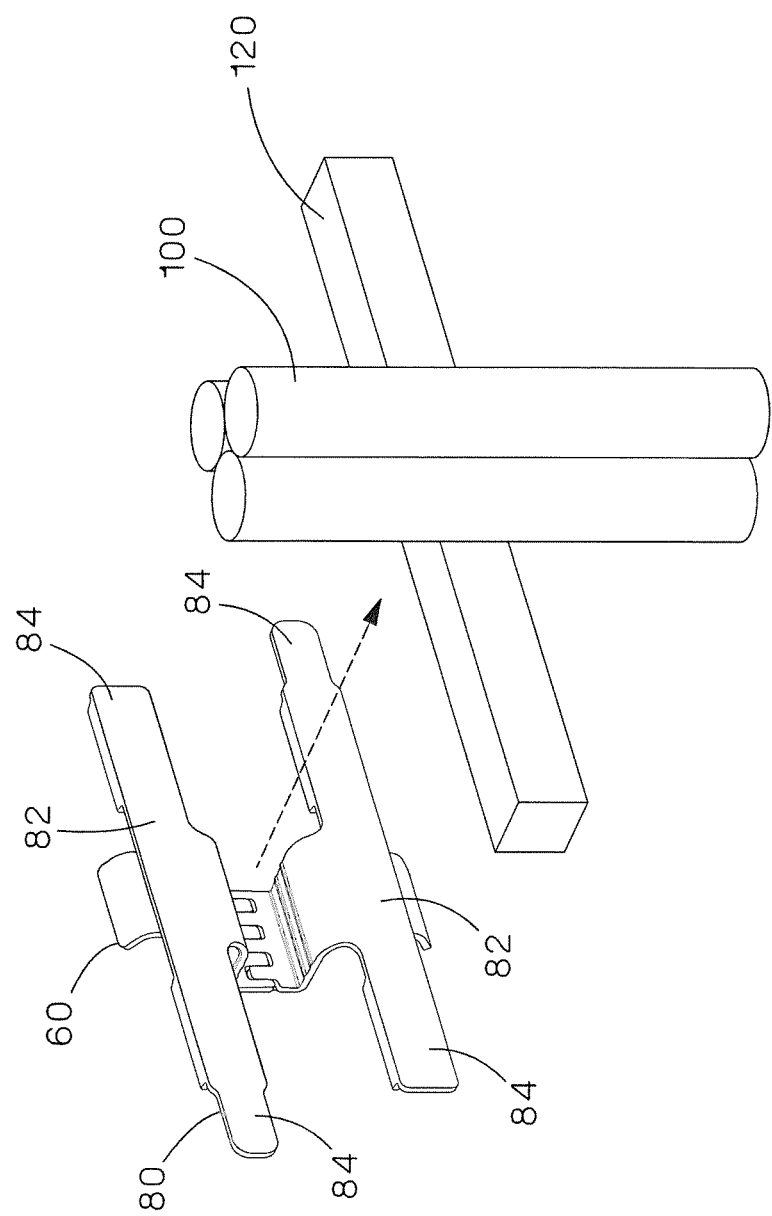
FIG. 7 is a perspective view of the metal bracket and protective grommet of FIG. 5 positioned to be installed on a ladder rung.
Figure 8:
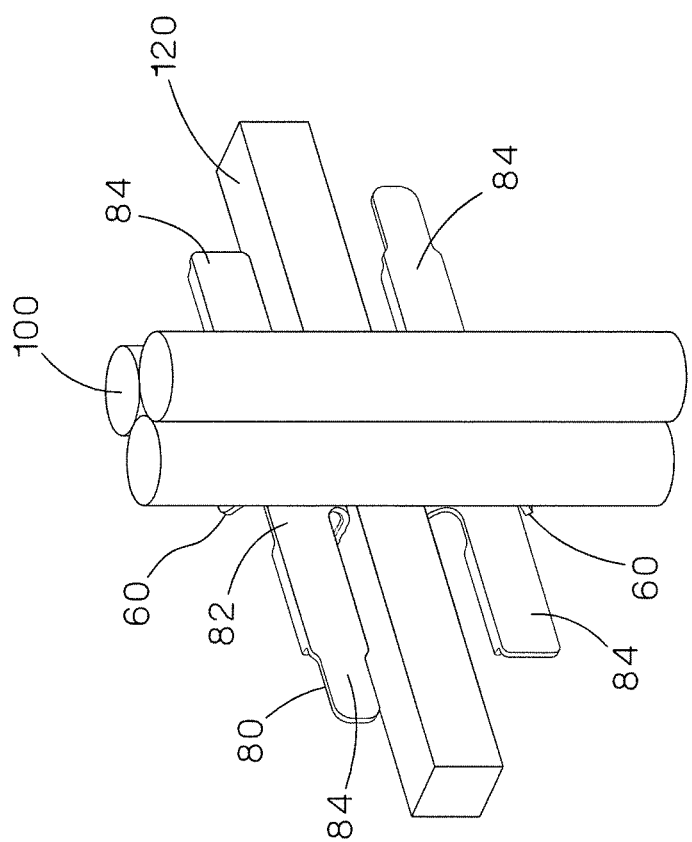
FIG. 8 is a perspective view of the metal bracket and protective grommet of FIG. 7 positioned on the ladder rung.
Figure 9:
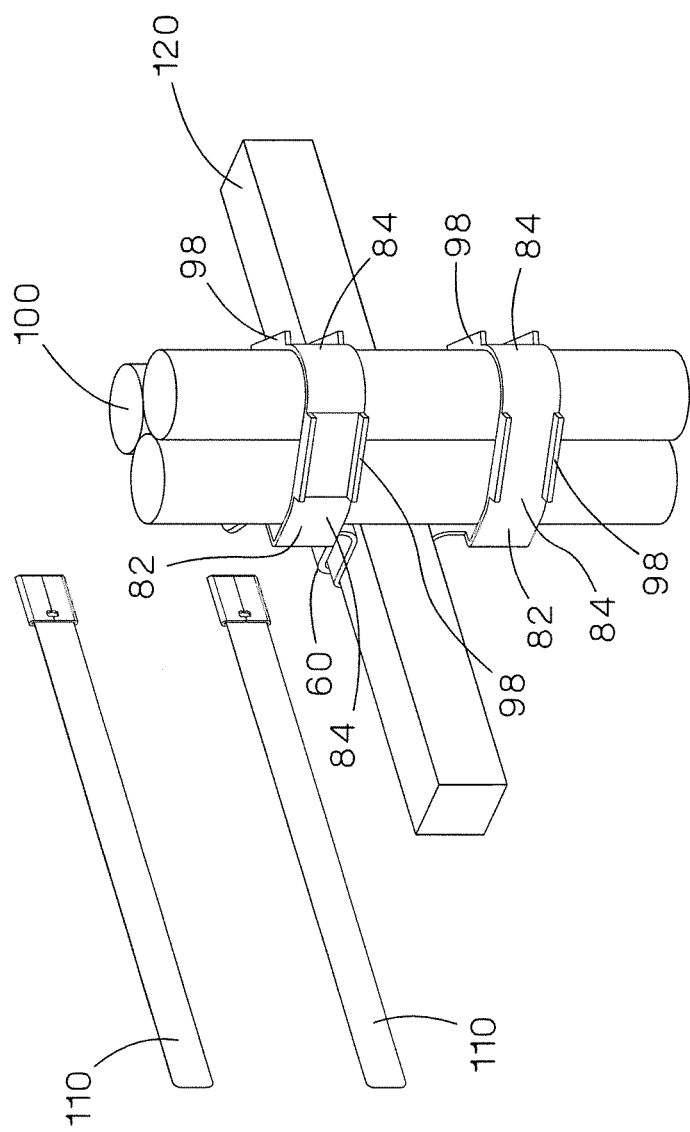
FIG. 9 is a perspective view of the metal bracket and protective grommet of FIG. 8 with the sleeves of the protective grommet wrapped around the cable bundle and metal ties positioned to be installed around the protective grommet.
Figure 10:
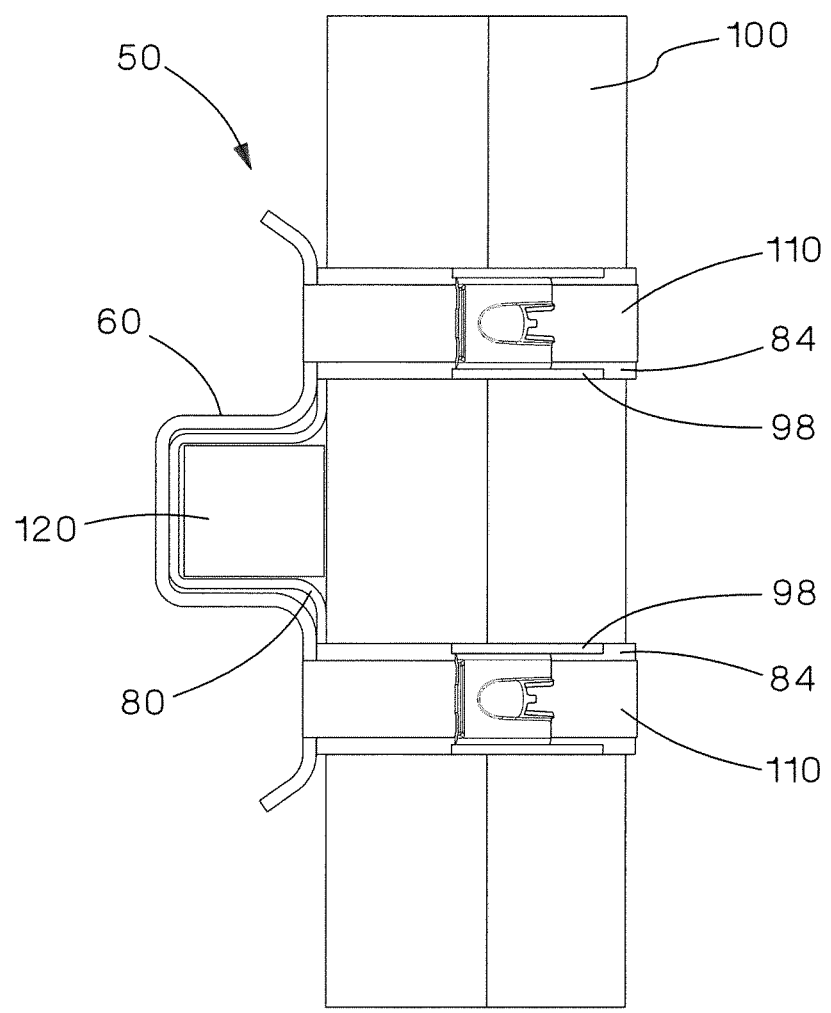
FIG. 10 is a side view of the ladder rung bracket assembly of FIG. 1.

FIGS. 7-10 illustrate assembled metal bracket 60 and protective grommet 80 being installed on the ladder rung 120. As illustrated in FIG. 7, the metal bracket 60 and protective grommet 80 slide onto the ladder rung 120 from the backside. Next, the sleeves 84 of the base member 82 of the protective grommets 80 are wrapped around the cable bundle 100, overlapped and locked into place (see FIGS. 8 and 9). Metal ties 110 are wrapped underneath one end of the metal bracket 60 and sleeve 84 of the protective grommet 80 to secure the cable bundle 100 to the ladder rung 120 (see FIGS. 9 and 10). Finally, a tool would tighten the metal ties 110 to complete installation of the ladder rung bracket assembly 50.

The ladder rung bracket assembly 50 is an improvement over prior ladder rung brackets. The protective grommet 80 of the present invention controls the lateral movement and the axial movement of the cable bundle 100. The interlocking protective grommet 80 also provides a hands free installation. The ladder rung bracket assembly 50 also provides short circuit protection, abrasion protection, greater cable diameter flexibility, and greater rung type flexibility.

Figure 11:
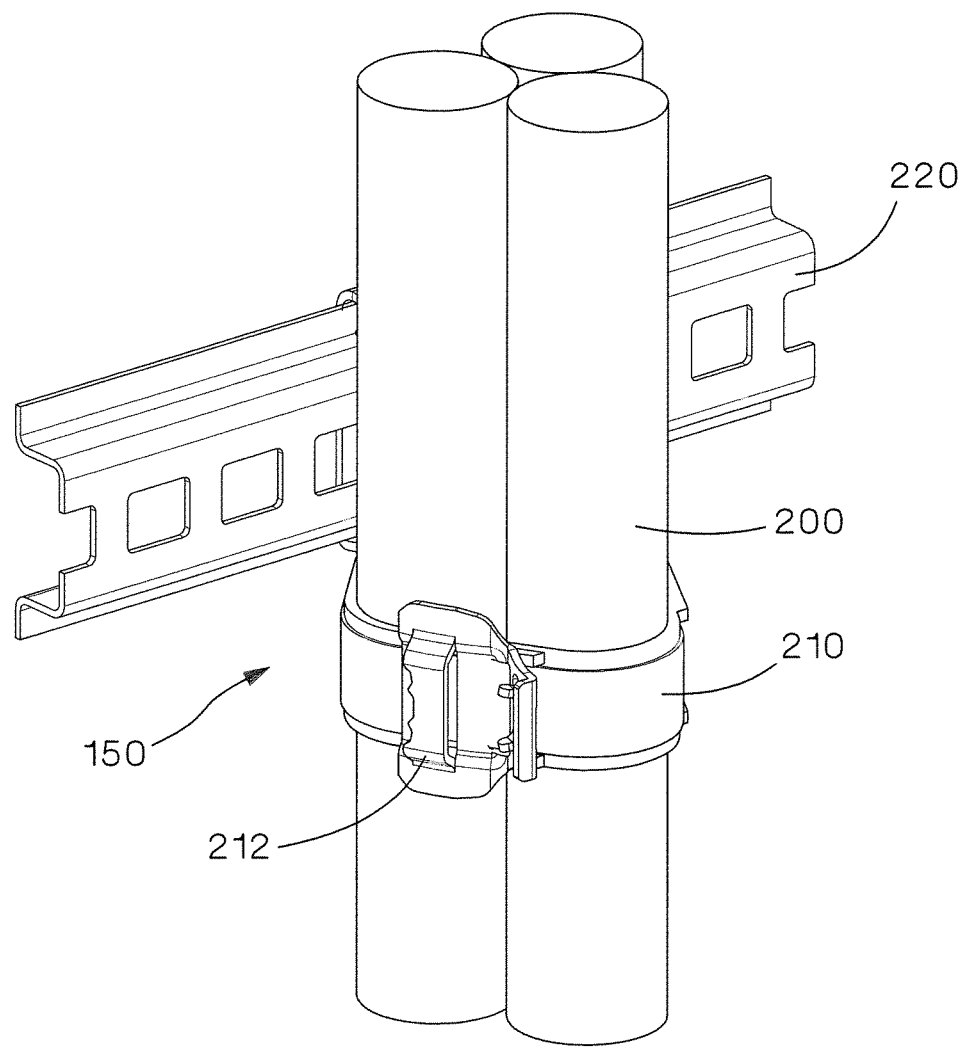
FIG. 11 is a perspective view of an alternative ladder rung bracket assembly securing cable bundles to a ladder rung.
Figure 13:
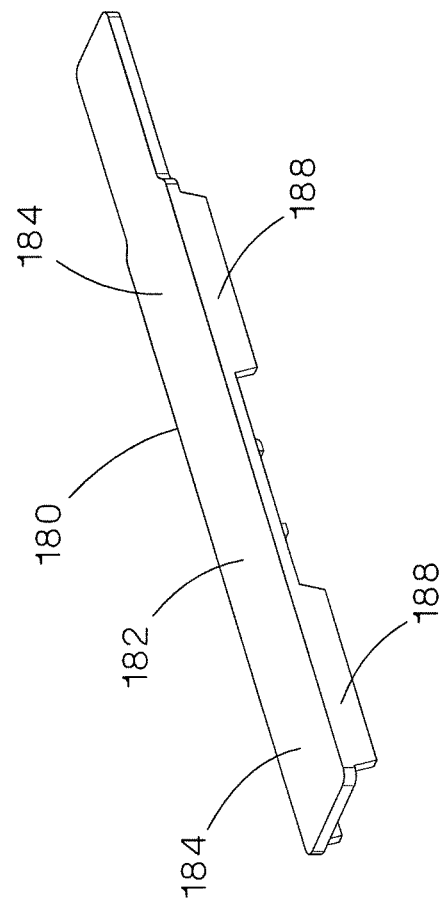
FIG. 13 is a perspective view of a grommet of the ladder rung bracket assembly of FIG. 11.

FIGS. 11-20 illustrate an alternative ladder rung bracket assembly 150 that is designed to be used with roll formed ladder rungs 220. As illustrated in FIG. 11, the ladder rung bracket assembly 150 secures a cable bundle 200 to a ladder rung 220 using a strap 210 and a buckle 212. The ladder rung bracket may also secure the cable bundle 200 to a ladder rung 220 using a metal tie.

Figure 12:
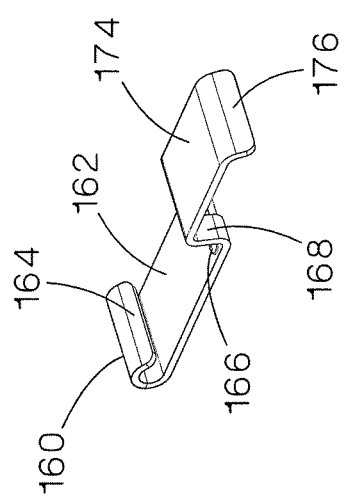
FIG. 12 is a perspective view of a metal bracket of the ladder rung bracket assembly of FIG. 11.
Figure 16:
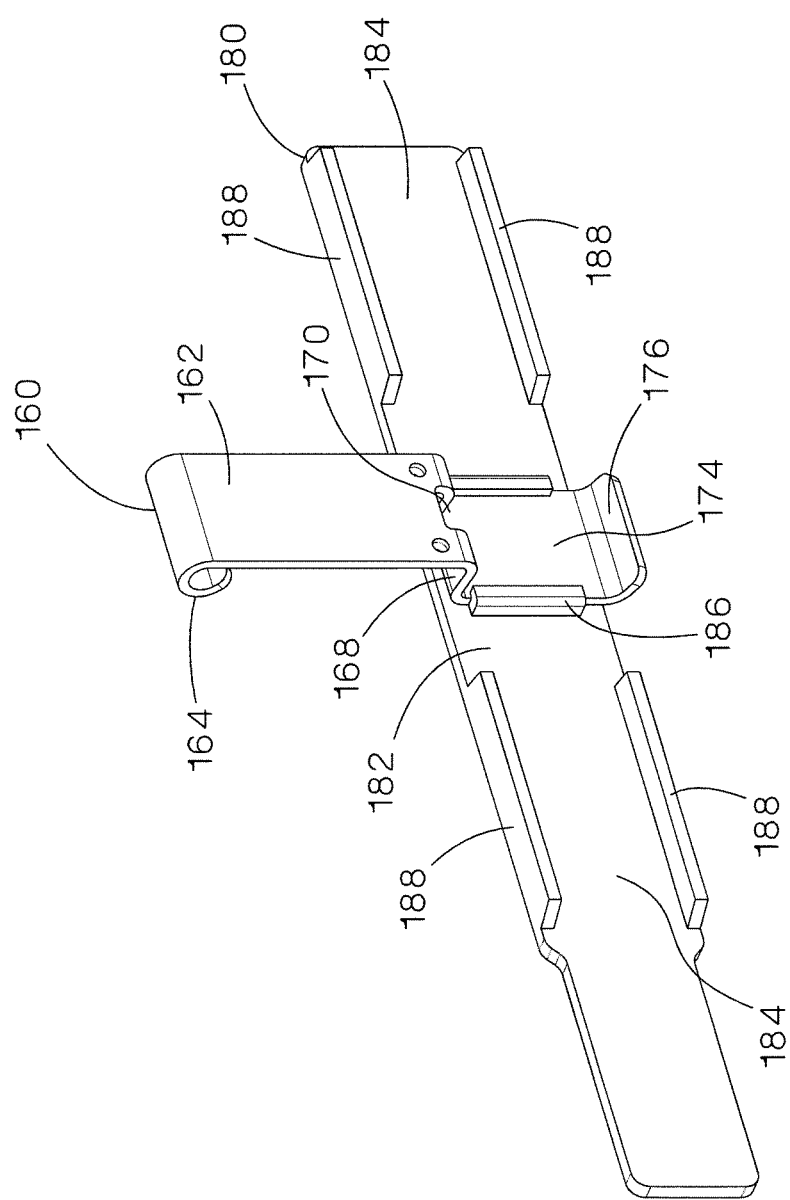
FIG. 16 is a rear perspective view of the assembled metal bracket and grommet of FIG. 15.

As illustrated in FIGS. 12-16, the ladder rung bracket assembly 150 includes a metal bracket 160 and a grommet 180. As illustrated in FIG. 12, the metal bracket 160 includes a first member 162, a side wall 168, and a second member 174. The distal end of the first member 162 includes a curved flange 164. The first member 162 also includes contact points 166. The sidewall 168 extends between the first member 162 and the second member 174. The sidewall 168 includes an opening 170 with a projection 172 (see FIGS. 14-15). The distal end of the second member 174 includes a flange 176.

As illustrated in FIGS. 13-16, the grommet 180 includes a base member 182 with sleeves 184. The backside of the grommet 180 includes a locking feature 186 (see FIG. 14). The locking feature includes two L-shaped flanges positioned to create a channel therebetween. The locking feature locks the grommet 180 into position when pressed onto the metal bracket 160. The backside of the sleeves 184 of the grommet 180 include flanges 188 for receiving a strap 210 and a buckle 212 (see FIG. 11). The flanges 188 eliminate the need for an installer to hold the sleeves 184 in position while applying the strap 210 and buckle 212 during final installation.

Figure 17:
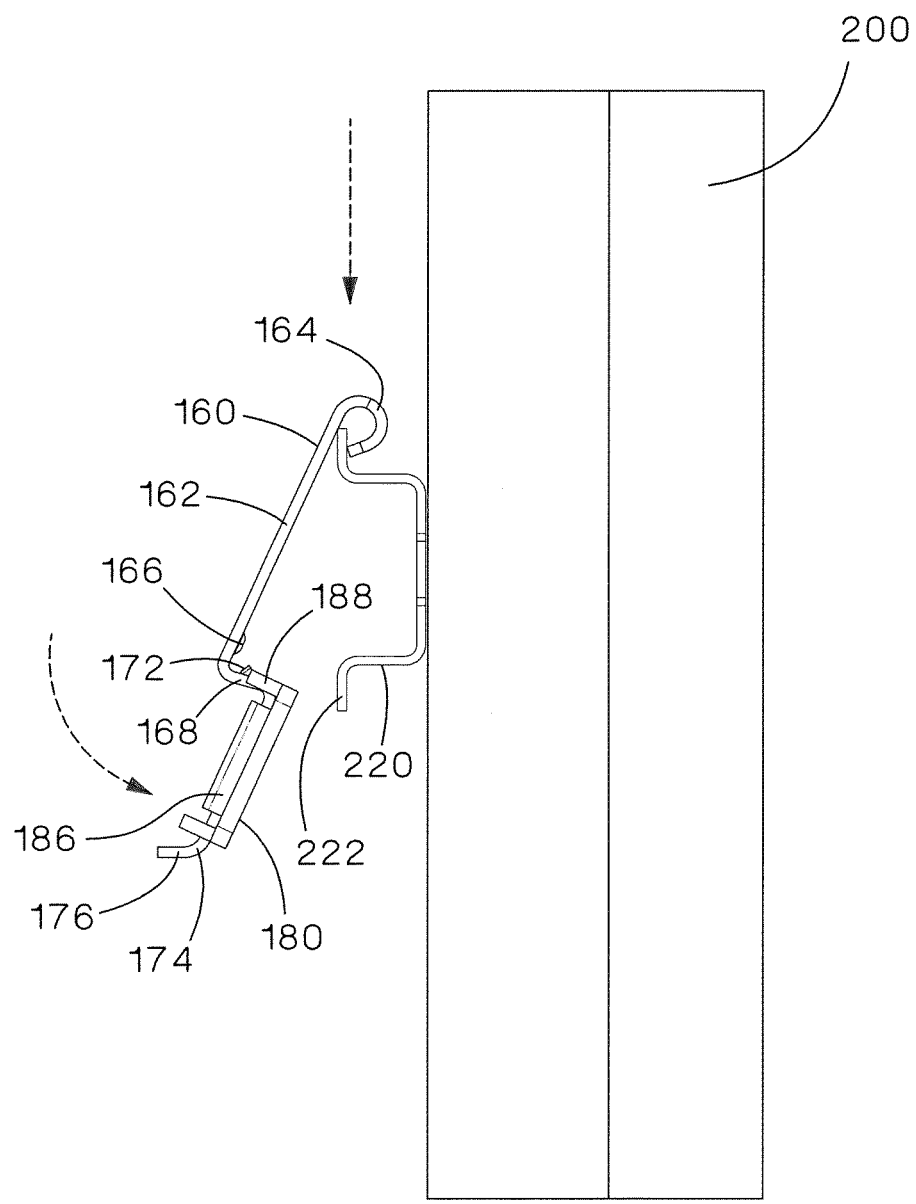
FIG. 17 is a side view of the metal bracket and grommet of FIG. 15 positioned to be installed on a ladder rung.
Figure 18:
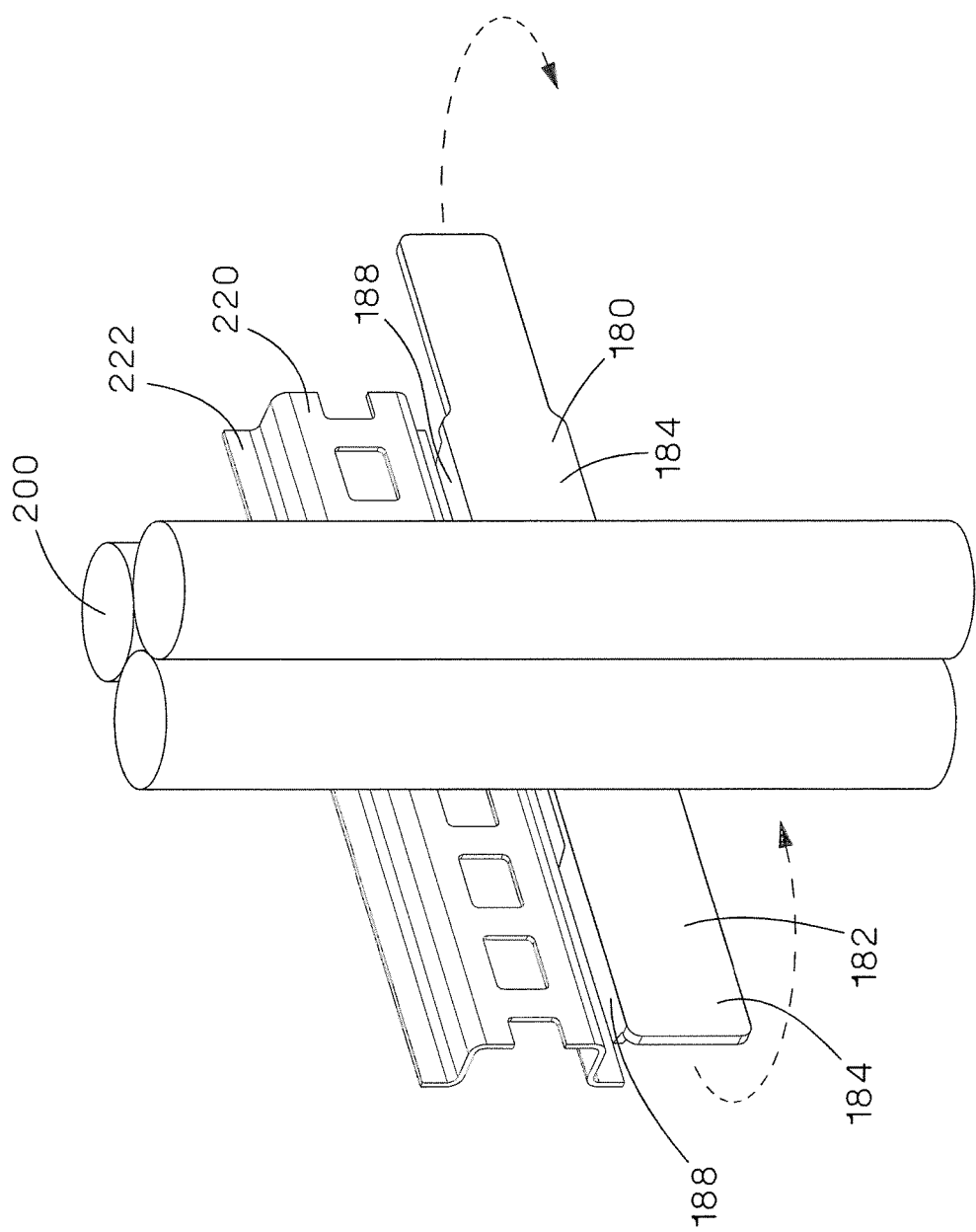
FIG. 18 is a perspective view of the metal bracket and grommet of FIG. 17 positioned on the ladder rung.
Figure 19:
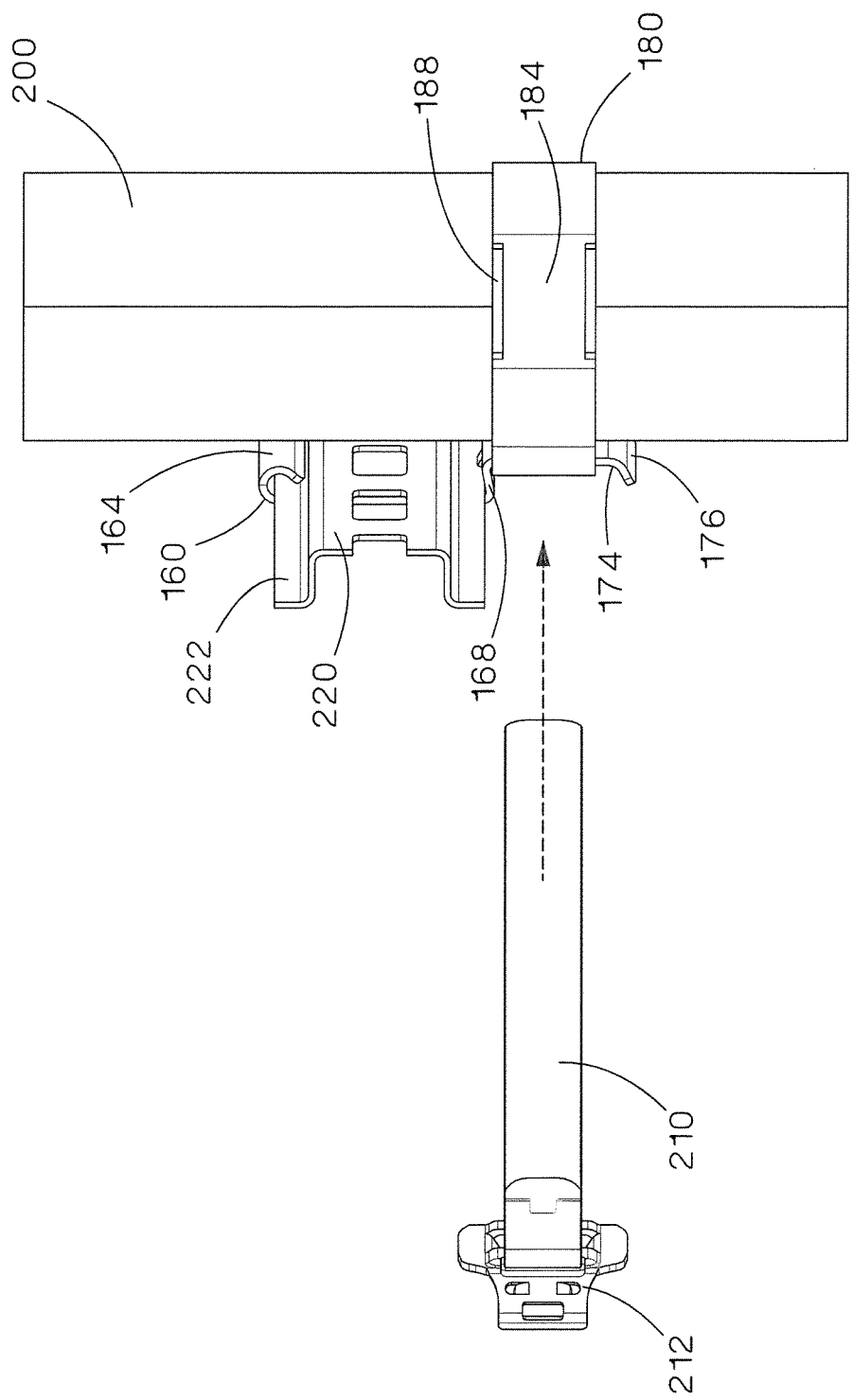
FIG. 19 is a perspective view of the metal bracket and grommet of FIG. 18 with the sleeves of the grommet wrapped around the cable bundle and a strap and buckle positioned to be installed around the grommet.
Figure 20:
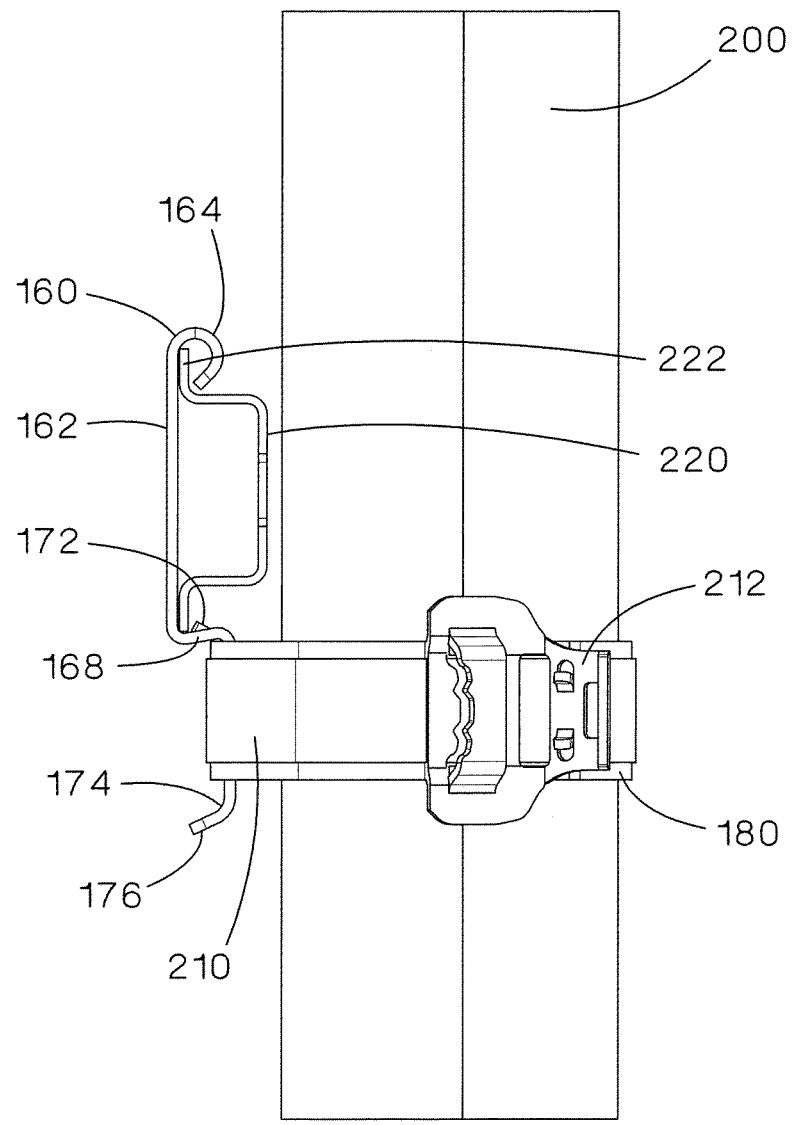
FIG. 20 is a side view of the ladder rung bracket assembly of FIG. 11.

FIGS. 17-20 illustrate the installation of the ladder rung bracket assembly 150 onto the ladder rung 220. As illustrated in FIG. 17, the curved flange 164 of the metal bracket 160 hooks around a flange 222 of the ladder rung 220. Next, the assembled metal bracket 160 and grommet 180 is rotated to engage the opposing flange 222 of the ladder rung 220 to clip the assembled metal bracket 160 and grommet 180 onto the ladder rung 220. As illustrated in FIGS. 18-19, the grommet sleeves 184 are wrapped around the cable bundle 200, overlapped, and locked into place. A strap 210 is wrapped underneath the metal bracket 160 and around the grommet sleeves 184 to secure the cable bundle 200 to the ladder rung 220 (see FIGS. 19-20). Finally, a tool tensions the strap 210 to complete the installation of the ladder rung bracket assembly 150.

The ladder rung bracket assembly 150 is also an improvement over prior art ladder rung brackets. The grommet 180 of the ladder rung bracket assembly 150 controls the lateral movement and the axial movement of the cable bundle 200. The interlocking flanges 188 of the grommet 180 provide a hands free installation. The ladder rung bracket assembly 150 also provides short circuit protection, abrasion protection, lower installation time, and greater cable diameter flexibility.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

The invention claimed is:

1. A bracket assembly for securing a cable bundle to a ladder rung, the bracket assembly comprising:
   a metal bracket; and
   protective grommets secured to the metal bracket, wherein each protective grommet having a base member, sleeves extending from the base member, a side member and a bottom member, wherein the protective grommets are interlocked with each other;
   whereby the assembled metal bracket and protective grommets receive the ladder rung and the sleeves of the protective grommet wrap around the cable bundle positioned on the ladder rung, wherein the sleeves overlap to secure the cable bundle.

2. The bracket assembly of claim 1, wherein the protective grommets are identical.

3. The bracket assembly of claim 1, wherein the bottom members of the protective grommets include a plurality of fingers.

4. The bracket assembly of claim 3, wherein the plurality of fingers of each protective grommet interlock, the interlocked fingers of the protective grommets create a channel for receiving the ladder rung.

5. The bracket assembly of claim 1, wherein the side members and the bottom members of the protective grommets include a crown feature for accommodating different rung dimensions and increasing resistance to movement when the bracket assembly is installed on the ladder rung.

6. The bracket assembly of claim 1, wherein the protective grommets further comprising flanges extending from a back side of the sleeves, whereby the flanges receive metal locking ties when the sleeves of the protective grommets are positioned around the cable bundle.

\* \* \* \* \*